United States Patent [19]

Shields

[11] 3,836,823
[45] Sept. 17, 1974

[54] ELECTRICAL ASSEMBLY
[75] Inventor: Marvin L. Shields, Bloomington, Ind.
[73] Assignee: Sarkes Tarzian, Inc., Bloomington, Ind.
[22] Filed: July 17, 1973
[21] Appl. No.: 380,008

[52] U.S. Cl.............. 317/100, 174/15 R, 174/16 R, 317/234 A
[51] Int. Cl. ............................................ H01k 1/12
[58] Field of Search............ 317/100, 234 A, 234 B; 174/15 R, 16 R, DIG. 5

[56] References Cited
UNITED STATES PATENTS

| | | | |
|---|---|---|---|
| 2,853,539 | 9/1958 | Kerr.................................. | 174/15 R |
| 3,132,288 | 5/1964 | Talentinow et al................. | 317/100 |
| 3,157,828 | 11/1964 | Flaherty............................ | 317/100 |
| 3,361,195 | 1/1968 | Meyerhoff et al. ............ | 317/100 X |
| 3,481,393 | 12/1969 | Chu ................................. | 317/100 X |
| 3,590,327 | 6/1971 | Thomae............................. | 317/100 |
| 3,646,424 | 2/1972 | Dangschat ...................... | 317/234 A |
| 3,686,533 | 8/1972 | Garnier et al...................... | 317/100 |

FOREIGN PATENTS OR APPLICATIONS 1,185,291   1/1965   Germany ........................ 317/234 A Primary Examiner—A. T. Grimley
Attorney, Agent, or Firm—Mason, Kolehmaihen, Rathburn & Wyss

[57] ABSTRACT

In combination one or more heat producing electrical components, each component having an elongated body and electrical connector leads extending from one or both opposite ends thereof; electrical insulating means provides a tubular conduit structure for containing a fluid heat exchange medium for cooling contact with the body of the electrical components, said conduit encapsulates and supports at least one end of the body of each electrical component body and also encapsulates and holds the electrical leads extending therefrom in secure electrically insulating arrangement with respect to other components, said conduit structure includes inner wall surfaces spaced apart from the exposed body surfaces of the electrical components except for short end portions encapsulated and supported thereby.

12 Claims, 8 Drawing Figures

PATENTED SEP 17 1974 3,836,823
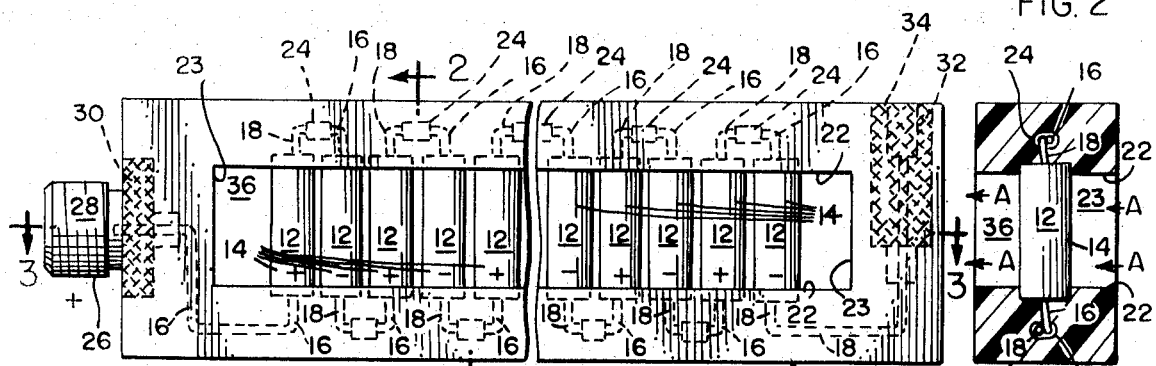
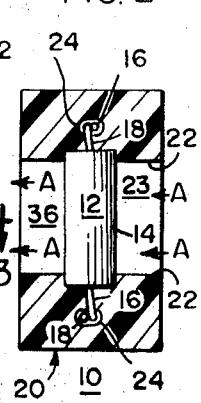
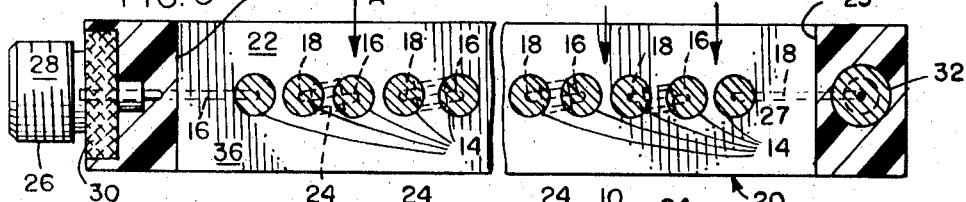
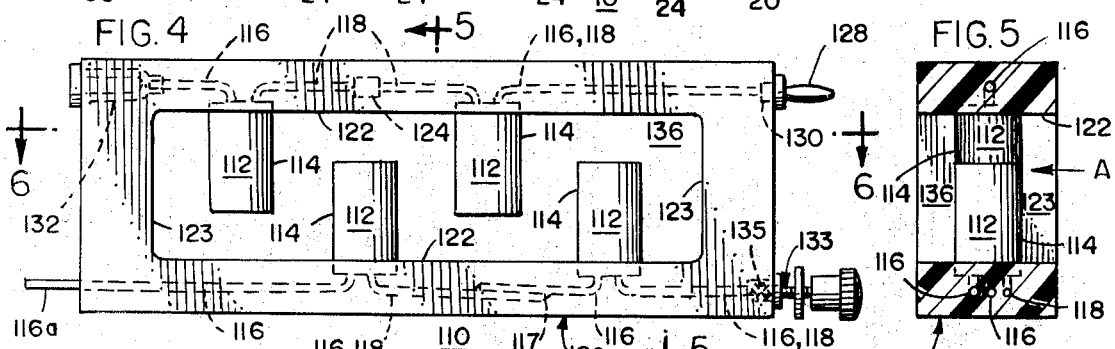
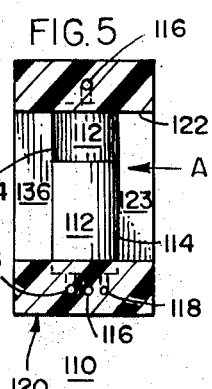
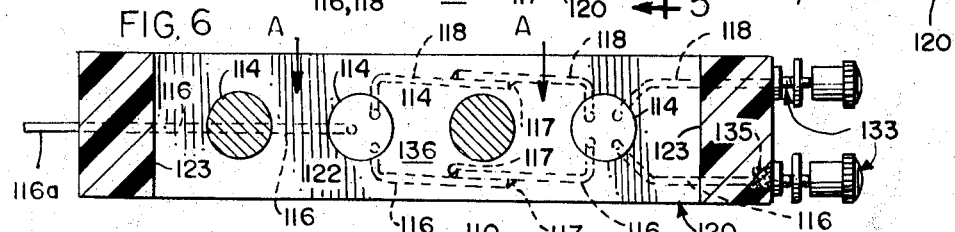
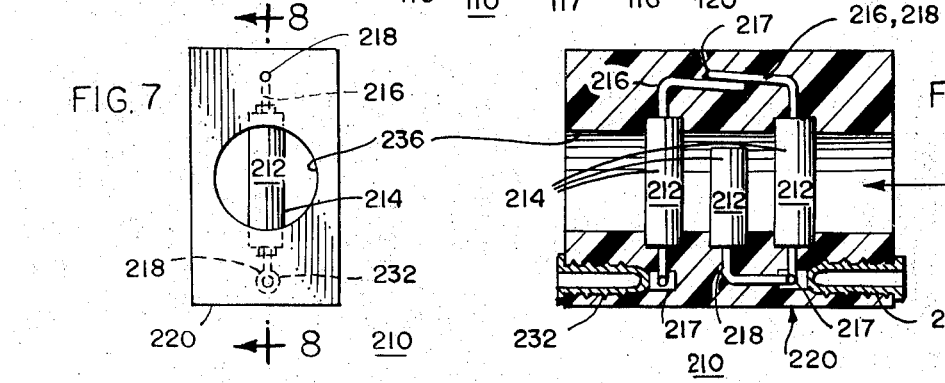
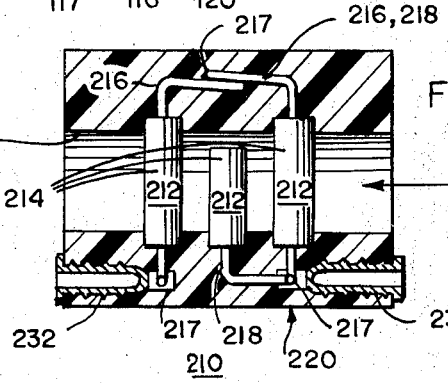

ELECTRICAL ASSEMBLY

The present invention relates to a new and improved assembly of electrical components and more particularly relates to a combination of one or more heat producing devices such as diodes and the like which are mounted and supported in a tubular conduit structure formed of insulating material and adapted to contain a flow of fluid heat exchange medium in direct contact with the bodies of the diodes for cooling the same. The electrically insulating conduit structure physically encapsulates and supports one or both ends of each diode and encapsulates and secures in place in insulating relation the electrical leads projecting from the ends of the diodes. Overall, the assembly of electrical components is especially well adapted for high voltage applications where heat generation is a problem.

It is an object of the present invention to provide a new and improved assembly of electrical components.

Moreover, it is an object of the invention to provide a new and improved assembly of heat producing electrical components such as diodes and the like wherein the bodies of the diodes are supported in a manner for direct exposure to a flow of cooling fluid contained in a supporting structure formed of electrically insulating material in the shape of a conduit for containing a flow of cooling fluid.

Another object of the present invention is to provide an electrical assembly of the character described wherein the conduit structure supports and provides electrical insulation of high dielectric strength for the end leads of the supported electrical components such as diodes and yet permits a maximum cooling of the diode bodies by direct contact of the coolant fluid therewith.

Another object of the present invention is the provision of a new and improved assembly of electrical components of the character described which is especially well adapted for high voltage applications because of the excellent insulating characteristics provided for supporting and encapsulating the electrical leads extending from the ends of the electrical components within the conduit structure.

Yet another object of the present invention is to provide a new and improved, high voltage, rectifier assembly including a plurality of diodes arranged with their bodies in spaced apart parallel array and supported and encapsulated at opposite ends in a tubular conduit structure formed of molded electrically insulating material in which are encapsulated the electrical leads extending from the ends of the diode bodies.

Another object of the present invention is to provide a new and improved electrical assembly of the character described wherein the individual electrical components are supported and encapsulated adjacent the ends thereof in a molded electrically insulating plastic resin material which provides high voltage insulation for the electrical leads and physically supports the electrical components by encapsulation of short end portions thereof leaving the major external surface area of the bodies exposed for direct contact to a flow of cooling fluid.

Another object of the present invention is to provide a new and improved electrical assembly of the character described which is capable of handling relatively high voltage and yet one which is relatively compact in size because of the extremely efficient manner of connecting and insulating the high voltage electrical leads extending from the ends of the individual electrical components in the assembly.

Still another object of the present invention is to provide a new and improved electrical assembly of the character described which is capable of utilizing a wide variety of external terminations such as pigtail leads, solderless terminals, female sockets and internally threaded terminals, male plug terminals with or without threads etc.

These and other objects and advantages of the present invention are accomplished in a preferred, illustrative embodiment comprising a combination of one or more heat producing electrical elements such as diodes and the like, each of which includes an elongated generally cylindrical body and electrical connector leads extending from one or both of the opposite ends of the body, an electrically insulating structure in the form of a tubular conduit is provided for containing a flow of cooling fluid flowing in direct contact with the bodies supported at their ends by the conduit structure. The wall structure of the insulating conduit encapsulates and supports short end portions of the bodies of the diodes and in addition encapsulates and insulates the electrical leads extending therefrom. The inside wall surfaces of the conduit structure are spaced apart from the surfaces of the body to provide an area for containing a flow of coolant fluid except for the short end portion of the diode bodies which are encapsulated and supported thereby. The electrical assembly thus described comprises a high voltage, modular type of electrical device which can be utilized alone or with similar modules in applications where heat generation, space factors and high voltage are design characteristics of significance.

BRIEF DESCRIPTION OF THE DRAWINGS

FIG. 1 is a side view of the electrical assembly.

FIG. 2 is a section view of the electrical assembly taken along line 2—2 of FIG. 1.

FIG. 3 is a section view of the electrical assembly taken along line 3—3 of FIG. 1.

FIG. 4 is another embodiment of an electrical assembly.

FIG. 5 is a section view the embodiment of FIG. 4 taken along line 5—5 of FIG. 4.

FIG. 6 is a section view of the embodiment of FIG. 4 taken along line 6—6 of FIG. 4.

FIG. 7 is an end view of yet another embodiment of an electrical assembly.

FIG. 8 is a section view of the embodiment of FIG. 7 taken along line 8—8 of FIG. 7.

Referring now more particularly to the drawings, therein is illustrated a new and improved rectifier assembly, constructed in accordance with the features of the present invention and referred to generally by the reference numeral 10. The rectifier assembly 10 includes a plurality of individual rectifiers or diodes 12, each having a generally cylindrical body 14 and positive and negative terminal leads, 16 and 18 respectively, extending axially outwardly from opposite ends of the body. The diodes 12 are arranged with their bodies 14 aligned in parallel, spaced apart relation on a common plane like the rungs of a ladder and are supported adjacent opposite ends by a hollow, tubular conduit structure 20 which is preferably fomred of electrically insulating, highly dielectric, molded plastic material having high physical strength such as phenolic, epoxy or silicon resin. The tubular insulating conduit structure 20 is adapted to confine and direct a transverse flow of cooling fluid such as air, oil or water in direct contact with and between the bodies 14 of the diodes 12 supported therein.

The insulating tubular conduit structure 20 is constructed to have an elongated, generally rectangular cross section with a similarly shaped flow passage therein and includes a pair of relatively long longitudinal side members having internal surfaces 22 which are parallel and are spaced apart by a dimension slightly less than the nominal axial length of the bodies 14 of the diodes 12. The conduit structure includes relatively short end members having internal surfaces 23 parallel to the longitudinal axes of the diodes 12. A short end portion on each end of each diode body 14 is encapsulated and supported in place by the side members of the tubular insulating structure 20 so that each diode is firmly maintained in spaced apart insulated relation from adjacent diodes. The molded dielectric plastic material of the conduit structure encapsulates and positions the respective positive and negative electrical leads 16 and 18 extending outwardly from opposite ends of each diode body 14 and as shown in the drawings, the diodes 12 are connected in series with the positive lead 16 of one diode connected to a negative lead 18 of the next adjacent diode in the ladder.

The electrical leads 16 and 18 may be interconnected in parallel if desired and may be connected by means such as soldering or metal connector clips 24 which are crimped in place after the leads are bent at right angles and provided with the proper lead dress. The insulating material of the conduit structure 20 encapsulates and maintains the leads 16 and 18 and the connectors 24 in proper insulating, lead dress and furthermore prevents movement of the leads.

The rectifier assembly 10 includes a positive terminal 26 extending outwardly from one end of the conduit structure and having external threads 28 thereon suitable for connection with an internally threaded female connector. The terminal 26 includes an enlarged, flanged based portion 30 having a knurled outer surface for better bonding strength with the resinous plastic material of the tubular structure 20 in which the terminal base is embedded. A positive lead 16 of the left hand diode 12 in the ladder is bent to shape as indicated and is extended into a hollow axial bore of the assembly terminal 26 and is soldered or crimped therein to provide good electrical connection. At the opposite end of the structure a female terminal 32 is embedded in the end member and is provided with a knurled outer surface for better bonding with the resinous insulating plastic material. The negative terminal 32 includes an internally threaded socket 34 for receiving a male, threaded terminal pin or the like and a lead 18 of the right hand diode 12 is bent to shape and extended into a blind axial bore provided in the terminal body for connection thereto by crimping or soldering.

The rectifier assembly 10 is especially well adapted for high voltage applications, for example 125 kilovolts, and in constructing the assembly, the diodes 12 are first positioned and held in the selected, spaced apart, parallel array by a suitable clamping jig having outer surfaces which form mold surfaces for defining the internal wall surfaces 22 and 23 of the tubular conduit structure 20. The positive and negative leads 16 and 18 respectively of each diode 12 are trimmed and bent to the desired lead dress and are electrically interconnected by means of the metal clips 24 or a soldering operation. The male and female terminals 26 and 32 are then positioned and held in place by a supporting jig structure and the appropriate leads 16 and 18 of the diodes 12 at opposite ends of the ladder are dressed appropriately and then are electrically connected thereto as previously described. An outer mold case is placed around the jig structures holding the diodes and terminals in place and is filled with suitable plastic resinous material to form the insulating conduit structure 20 of rectangular cross section as shown. After the plastic is cured the completed assembly is released from the jigs and mold case. The inner surfaces 22 and 23 of the molded conduit structure 20 defines a flow path or area 36 for confining and directing the flow of cooling fluid transversely (arrows A) over the outer surfaces of the diode bodies 14 for substantially the entire length of the diode bodies except for the short end portions which are encapsulated for support. The molded tubular conduit is formed of molded phenolic, epoxy or silicone resinous material having an extremely high dielectric constant and having excellent mechanical strength and resistance to heat. The tubular conduit structure supports and maintains the proper insulating lead dress in a manner suitable for high voltage applications and high physical forces applied to the assembly 10.

Referring now to FIGS. 4, 5 and 6, therein is illustrated another embodiment of the present invention referred to generally by the reference numeral 110 and constructed in accordance with the features of the present invention. The electrical assembly 110 and its various components having counterparts identical or similar to those in the prior embodiment will be given similar reference numerals with the prefix 1 added and only the differences in the two embodiments will be described in detail herein.

The electrical assembly 110 includes a rectangular shaped tubular conduit structure 120 similar to the structure 20 of the previous embodiment and formed of electrically insulating, high dielectric, heat resistant, physically strong molded plastic material such as phenolic, acrylic, epoxy or silicone resin. The tubular conduit structure includes a pair of elongated longitudinal side members having parallel inside surfaces 122 and a pair of relatively short transverse end members having transverse inside surfaces 123. The inner surfaces 122 and 123 define a flow conduit 136 of generally rectangular cross section which is adapted to contain and direct a flow of coolant medium such as oil, water or air over a plurality of heat producing electrical components 112 such as transistors, integrated circuit assemblies, rectifiers, diodes and the like. These components are exposed directly to the flow of coolant medium moving in the direction of the arrows A through the flow path 136 defined by the tubular conduit structure. Each of the heat producing electrical components 112 is provided with a body portion 114 exposed in direct contact with the flowing coolant fluid and is supported in the conduit structure by encapsulation of a short portion of one end within the material of the longitudinal side members of the tubular conduit structure. In addition, each of the electrical components 112 includes one or more electrical leads 116 or 118 projecting outwardly from the supported end or base of the component body 114 and the leads are embedded within and supported and insulated by the resinous plastic material of the tubular conduit structure. Various different means may be provided for interconnecting the leads 116 and 118 such as soldering 117 and/or deformable metal clips such as the clips 124. In addition, the modified electrical assembly 110 may have one or more tubular female socket members 132 similar to the female socket member 32 of the previous embodiment connected to an appropriate lead 116 or 118 of an electrical component 112 and the socket member 132 may be embedded within a particular selected side or end face of the tubular conduit structure 120 as illustrated. A variety of other types of male terminals may be provided such as a nonthreaded banana plug type terminal 128 having a base portion 130 with a knurled outer surface embedded within the plastic resinous material of the tubular conduit structure 120. Other types of terminals such as externally threaded binding post type terminals 133 may be utilized and these will generally be provided with a knurled base portion 135 embedded and encapsulated by the resinous material of the tubular conduit structure. In some instances, a separate terminal for the leads 116 or 118 will not be provided and simply a pigtail type terminal end portion of the lead 116a will be extended outwardly of the tubular conduit structure 120 for electrical connection thereto. The tubular conduit structure 120 performs a similar function to that of the conduit structure 20 of the prior embodiment in encapsulating and supporting only one rather than both opposite end portions of each of the heat producing electrical components 112. The outer ends of the components 112 are thus free to provide for even greater surface area contact with the cooling fluid. Some of the electrical components 112 may require substantial heat transfer to the cooling fluid flowing through the flow path 136, while others of components 112 may require little or no heat transfer to the fluid medium. In either event, the components carried in the electrical assembly 110 are positively supported only at one end by the encapsulating plastic resinous material of the tubular structure 120 and the flow of coolant fluid passes directly over the outer end surfaces of the bodies 114 for better cooling. The insulating dielectric characteristics of the molded plastic tubular conduit structure 120 is well adapted to support and insulate the various leads 116 and 118 of the electrical components and these leads may be arranged and dressed in a variety of different configurations and interconnections as best illustrated in FIG. 6. A wide variety of different types of internal connectors and external terminals and connectors may be utilized. The molded plastic, rigid insulating resinous material forming the tubular conduit structure 120 provides an excellent means of insuring good insulation and excellent physical support and heat transfer capability for the electrical components 112 and the leads thereof, and the internal and external connectors and terminals therefor.

Referring now to FIGS. 7 and 8, therein is illustrated yet another embodiment of an electrical assembly referred to generally by the reference numeral 210 and constructed in accordance with the features of the present invention. The prefix 2 will be utilized in describing components of the assembly 210 having counterparts similar or identical to those of the prior embodiment. The electrical assembly 210 is provided with a tubular conduit structure 220 also formed of insulating high dielectric, rigid plastic material in a generally rectangular cross-section as shown in FIG. 7. The conduit structure 220 is formed with an elongated flow passage 236 having a generally circular cross-section for containing a flow of heat exchange fluid. The assembly 210 includes a plurality of electrical components 212 having elongated bodies 214 positioned in heat transfer relation within the flow area 236. Some of the components 212 (FIG. 8) are supported at both of their opposite ends by encapsulation of short end portions in the conduit structure while other components are supported by embedding a short portion of only one end thereof as indicated by the middle electrical device 212 as shown in FIG. 8. Electrical leads 216 and 218 are interconnected within and embedded by the plastic resinous material forming the tubular conduit structure 220 and soldering connections 217 may be utilized to provide electrical connection between the leads and various other types of terminals and connectors such as the socket terminals 232 similar to the prior female terminals as described in the previous embodiments may also be used. Some of the electrical components 212 of the assembly 210 are supported at both of their opposite ends by embedding a short end section of the bodies 214 within the plastic resinous insulating material of the tubular conduit structure 210 while others of the electrical components 212 require support by embedding only one end of their body within the resinous material of the tubular conduit structure. In both cases the tubular conduit structure is utilized to physically support the electrical elements 212 in heat exchange relationship with the fluid medium flowing through the flow path 236 defined by the tubular conduit structure. In addition the conduit structure provides physical support for the electrical components and provides electrical insulation, physical support and separation for the electrical leads 216 and 218, connectors and internal and external terminal units that are used.

From the foregoing it will be seen that the tubular conduit structures of the various embodiments acts to physically support the electrical components of an assembly from one or both ends while exposing a major portion of the body surface of the components in heat exchange relation with the flow of fluid medium moving through the flow path defined by the conduit structure. The conduit structure physically supports and provides an insulating medium which encapsulates the electrical leads, circuits, connectors and terminals for the assembly which may be of a wide variety as indicated. Because the electrical leads are firmly embedded within the insulating plastic material of the conduit structure the completed modular assemblies are able to handle extremely high operating voltages and can withstand relatively high physical forces such as those involved in applications for aviation and space electronic components.

As the present invention has been described by reference to several embodiments thereof, it will be apparent that numerous other modifications and embodiments will be devised by those skilled in the art which will fall within the true spirit and scope of the present invention.

I claim:

1. In combination, a plurality of diodes connected in series, each of said diodes having an elongated body and a pair of connector leads extending axially from opposite ends of said body, insulating means forming an integral tubular conduit structure for containing a flow of fluid heat exchange medium for direct contact with said bodies, said insulating conduit structure including a pair of side members supporting and encapsulating relatively short opposite end portions of each body, said bodies arranged in parallel spaced apart relation transverse to said side members, said side members encapsulating, insulating and rigidly supporting said leads extending from said bodies.

2. The combination of claim 1 wherein said tubular conduit structure comprises an integrally molded plastic resin having a high dielectric constant.

3. The combination of claim 2 including one or more external terminal means connected with said lead of at least one of said diodes and including a base portion encapsulated in said resin of said tubular conduit structure.

4. The combination of claim 3 wherein said base portion of said terminal means includes a knurled outer surface embedded in said resin of said tubular conduit structure.

5. The combination of claim 2 wherein said conduit structure is formed from the group consisting of acrylic resin, silicone resin, phenolic resin or epoxy resin.

6. The combination of claim 2 including connector means for interconnecting leads of adjacent diodes embedded and encapsulated within said side members of said tubular conduit structure.

7. In combination, one or more heat producing electrical components, each of said components having an elongated body and connector leads therefor extending from one or both opposite ends of said body, electrical insulating means forming a tubular conduit structure for containing a flow of fluid heat exchange medium for direct contact with said bodies, said insulating conduit supporting and encapsulating at least one end portion of each body and encapsulating and rigidly positioning said leads extending therefrom, said conduit having wall surfaces spaced apart from the surfaces of said bodies except for said end portions supported thereby.

8. The combination of claim 7 wherein relatively short end portions of said bodies of said components are embedded in said conduit structure for supporting the components, and including connector means for interconnecting leads of said components embedded in said conduit structure.

9. The combination of claim 7 wherein some of said components are supported in said conduit structure with short end portions at opposite ends embedded in said structure and at least another of said components having a short end portion at one end embedded in said structure for support and an opposite free end exposed to said fluid medium flowing in said structure.

10. The combination of claim 7 wherein said tubular conduit structure is formed of integrally molded rigid resinous plastic material having a high dielectric constant and includes a pair of longitudinal portions supporting the ends of said components extending transversely outwardly thereof.

11. The combination of claim 10 wherein said tubular conduit structure defines a flow path extending longitudinally thereof between opposite ends, said components aligned along a common plane bisecting said flow path.

12. The combination of claim 11 wherein said flow path is of circular cross section and said common plane extends longitudinally thereof.

* * * * *